US012675257B2

(12) United States Patent
Keskin et al.

(10) Patent No.: US 12,675,257 B2
(45) Date of Patent: Jul. 7, 2026

(54) HYBRID COMPUTE-IN-MEMORY

(71) Applicant: QUALCOMM Incorporated, San Diego, CA (US)

(72) Inventors: Mustafa Keskin, San Diego, CA (US); Francois Ibrahim Atallah, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 17/695,824

(22) Filed: Mar. 15, 2022

(65) Prior Publication Data

US 2023/0297335 A1 Sep. 21, 2023

(51) Int. Cl.
*G06F 7/523* (2006.01)
*G06F 7/50* (2006.01)

(52) U.S. Cl.
CPC .............. *G06F 7/523* (2013.01); *G06F 7/50* (2013.01)

(58) Field of Classification Search
CPC ......... G06F 7/523; G06F 7/50; G06N 3/0464; G11C 11/54
See application file for complete search history.

(56) References Cited

U.S. PATENT DOCUMENTS

2020/0026498 A1* 1/2020 Sumbul ............... G06F 12/0811
2020/0412374 A1* 12/2020 Whatmough .......... G06N 3/082

2021/0295905 A1* 9/2021 Lee ...................... G06F 15/7821
2022/0050621 A1* 2/2022 Park ...................... G06F 3/0679
2022/0074988 A1* 3/2022 Chen ............... G01R 31/31724
2022/0237440 A1 7/2022 Kimura et al.
2022/0351761 A1* 11/2022 Yang ..................... H03M 1/468
2023/0045840 A1* 2/2023 Chih .................. G11C 11/4074
2023/0188146 A1* 6/2023 Kim ...................... H03M 1/002
341/163

FOREIGN PATENT DOCUMENTS

CN 101510444 A * 8/2009
WO 2020234681 A1 11/2020
WO WO-2020257531 A1 * 12/2020 ............. G06N 3/065
WO 2021158341 A1 8/2021

OTHER PUBLICATIONS

International Search Report and Written Opinion—PCT/US2023/014286—ISA/EPO—Jun. 20, 2023.
Wikipedia: "Sample and Hold", Jun. 7, 2018, pp. 1-3, XP093053415, p. 1.

* cited by examiner

*Primary Examiner* — James Trujillo
*Assistant Examiner* — Jakob Oscar Gudas
(74) *Attorney, Agent, or Firm* — Loza & Loza LLP

(57) ABSTRACT

A compute-in-memory array is provided that implements a filter for a layer in a neural network. The filter multiplies a plurality of activation bits by a plurality of filter weight bits for each channel in a plurality of channels through a charge accumulation from a plurality of capacitors. The accumulated charge is digitized to provide the output of the filter.

24 Claims, 7 Drawing Sheets charging a first plate of a capacitor responsive to a multiplication of a first activation bit signal with a first filter weight bit signal      ⌐700 charging a second plate of the capacitor responsive to a multiplication of a second activation bit signal with a second filter weight bit signal      ⌐705

HYBRID COMPUTE-IN-MEMORY

TECHNICAL FIELD

This application relates to compute-in-memories, and more particularly to a hybrid compute-in-memory.

BACKGROUND

Digital processing of data typically uses a Von Neumann architecture in which the data is retrieved from a memory to be processed in an arithmetic and logic unit (ALU). In computation-intensive applications such as machine learning, the data flow from and to the memory may become a bottleneck for processing speed. Compute-in-memory architectures have been developed in which the data processing hardware is distributed across the bitcells. As compared to traditional digital computers, compute-in-memories may have reduced power consumption in that the data does not need to be transported to a processing unit. In addition, compute-in-memories reduce power consumption because compute-in-memories perform multiplication and summation operations in the analog domain such as by accumulating charge from a plurality of capacitors.

Despite the power savings, compute-in-memories typically require an analog-to-digital converter (ADC) to convert the voltage resulting from the accumulated charge into a digital value. To minimize the ADC power consumption, it is conventional to utilize a successive-approximation or slope ADC, but this slows operating speed. To have the same precision as traditional digital computing, a high-resolution ADC is desirable but then operating speed may again be reduced and power consumption increased. For edge and server machine learning applications needing trillions of operations per second, it is thus conventional to use a traditional digital architecture at the cost of increased power consumption as compared to a compute-in-memory computation.

SUMMARY

In accordance with an aspect of the disclosure, a compute-in-memory is provided that includes: a capacitor including a first plate and a second plate; a voltage source; a first switch configured to close responsive to a first activation bit signal; a second switch coupled in series with the first switch between the voltage source and the first plate, the second switch being configured to close responsive to a first filter weight bit signal; a third switch configured to close responsive to a second activation bit signal; and a fourth switch coupled in series with the third switch between the voltage source and the second plate, the fourth switch being configured to close responsive to a second filter weight bit signal.

In accordance with another aspect of the disclosure, a method of operation of a compute-in-memory is provided that includes: charging a first plate of a capacitor responsive to a multiplication of a first activation bit signal with a first filter weight bit signal; and charging a second plate of the capacitor responsive to a multiplication of a second activation bit signal with a second filter weight bit signal.

In accordance with yet another aspect of the disclosure, a compute-in-memory is provided that includes: a compute line; and a plurality of arithmetic cells, each arithmetic cell including a capacitor having a first plate and a second plate, a first serial pair of switches coupled between the first plate and a voltage source; a second serial pair of switches coupled between the second plate and the voltage source, and a compute switch coupled between the first plate and the compute line.

These and other advantageous features may be better appreciated through the following detailed description.

BRIEF DESCRIPTION OF THE DRAWINGS

Aspects of the present disclosure and their advantages are best understood by referring to the detailed description that follows. It should be appreciated that like reference numerals are used to identify like elements illustrated in one or more of the figures.

DETAILED DESCRIPTION

Figure 1:
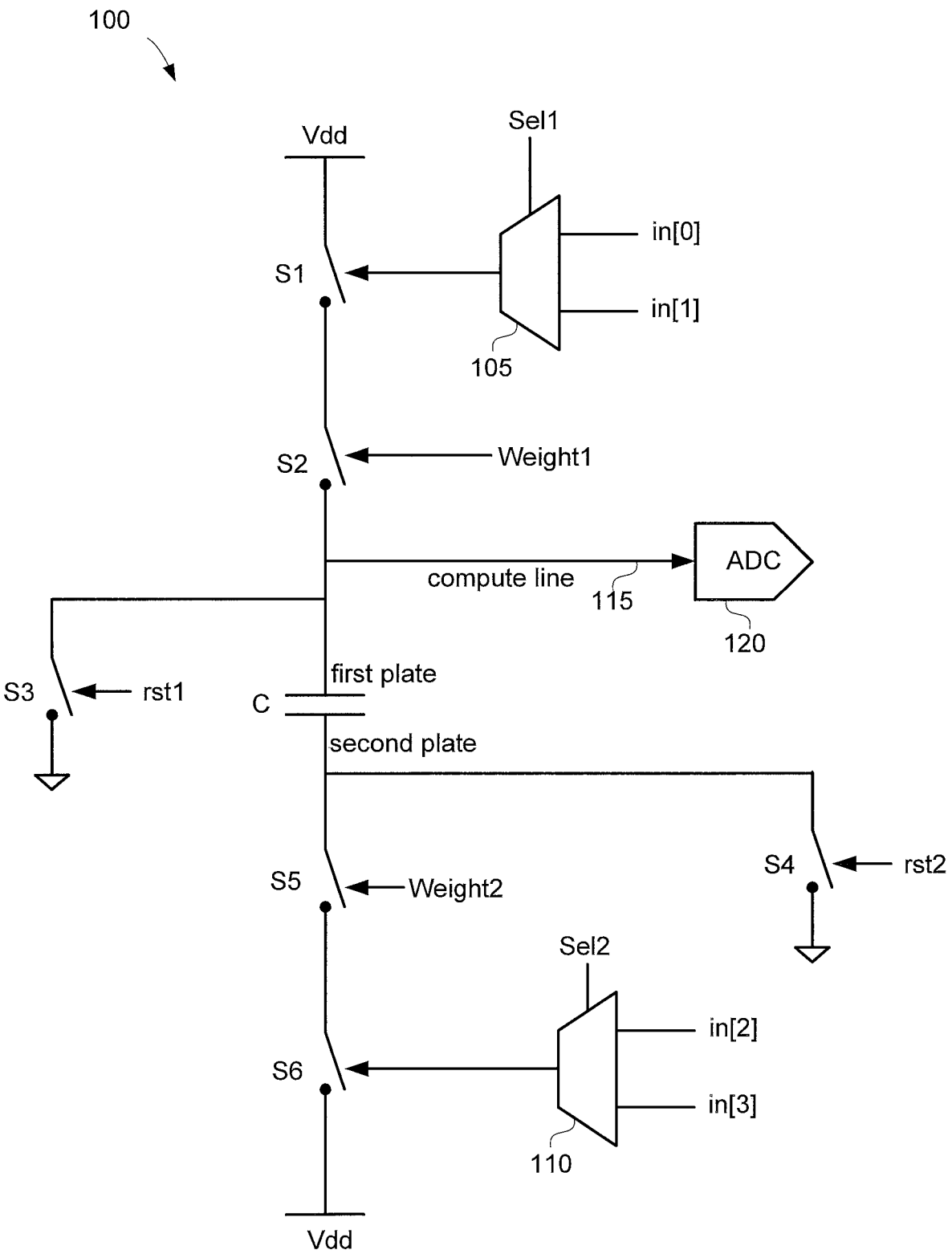
FIG. 1 illustrates a hybrid compute-in-memory including an arithmetic cell in which a first plate of a capacitor is charged during a first multiplication phase and in which a second plate of the capacitor is charged during a second multiplication phase in accordance with an aspect of the disclosure.

A hybrid compute-in-memory architecture is provided that combines the speed of traditional digital computing with the power savings of compute-in-memory computation. To provide a better appreciation of these advantageous features, some background concepts in neural networks will first be discussed. The data processing in a convolutional neural network (CNN) begins with the input data. For example, the input data may be pixels of a color image or digital voice samples and so on. The following discussion will assume the input data is color image data without loss of generality. To support a color image, each pixel may have a red component, a green component, and a blue component. Each color component for a given image may be deemed to form a channel for the CNN computation. Other colors in the image such as magenta may also form a channel. Note that non-color components such as image intensity may also form their own channel.

Each stage in a CNN computation may be designated as a layer. The input data is thus processed in an input layer. The output of a given layer is then processed by a succeeding layer until a final output layer is reached. If there are just red, green, and blue components in the input data, an initial layer for the CNN may thus have only three channels. But as the CNN processing proceeds from layer to layer, the number of channels may markedly increase over the initial value (or stay the same or even reduce in value).

Another fundamental concept in CNN computation is the concept of a filter. With regard to a filter in the input layer, the pixels may be deemed to be arranged in rows and columns. For example, suppose the filter for the input layer is a 3×3 filter. Such a filter size would involve a square filter window of nine pixels. This filter window may be deemed to be formed by 3 consecutive rows of three pixels each. Alternatively, the window may be deemed be formed by 3 consecutive columns of three pixels each. Each pixel in the filter window is multiplied by a corresponding filter weight and summed to form a filter weight output. The filter window is then convolved across the image to produce a matrix of filter weight outputs that propagate to the next layer. Since there are multiple channels, the outputs of the filter on each channel may be summed to form the filter weight outputs that propagate to the next layer. If the filter size is just 1×1, then the filter computation in any given layer is determined by the multiplication of one pixel with the corresponding filter weight. Such a filter may be denoted as a one-tap filter. Should the filter size be 2×2, the resulting filter may be deemed to be a four-tap filter. Similarly, a filter that is 4×4 may be deemed to be a 16-tap filter, and so on.

The input data to a given layer may be denoted as activation data. In the initial layer of the neural network, the activation is thus equal to the input pixels whereas the activation to a subsequent layer is formed by the outputs of the filters for the previous layer. The precision (number of bits) to express each activation and filter weight depends upon the implementation. In the following discussion it will be assumed that each filter weight is 4-bits wide (a nibble) and that each activation is one-byte wide, but it will be appreciated that other bit widths may be used in alternative implementations. Suppose a layer has sixty-four channels with eight activations and sixty-four filter weights. The number of multiplications of each 4-bit filter weight times each 8-bit activation is eight due to the eight activations. So that is eight multiplication operations for each channel for each filter weight. Repeating this multiplication across the 64 channels leads to 512 multiplication operations for each filter weight across all the channels. Since there are sixty-four filter weights, there are 512×64=16,384 multiplications per filter tap. The results of these 16,384 multiplications must then be added, which leads to approximately another 16,383 additions. The number of operations per filter tap is thus approximately 65,500. Should these computations be repeated at a 550 MHz rate, the resulting CNN processing requires approximately 32.8 trillion operations per second (TOPs).

As noted earlier, achieving such a relatively fast computation speed in a traditional compute-in-memory (CiM) architecture is problematic. A compute-in-memory bitcell is advantageous in that a filter weight bit is stored relatively close to the logic gate and capacitor that stores the result of the multiplication of the filter weight bit with the corresponding activation bit. The resulting charge on a plurality of the capacitors may then be accumulated. This analog accumulation of charge is very efficient as compared to a digital multiply and accumulate operation. But then the accumulated charge is converted to a digital value in an ADC. To achieve a relatively high rate of computation speed with sufficient resolution in an ADC is typically expensive and problematic such that traditional digital computers are used for high-speed neural network calculations (e.g., in excess of 10 TOPS). As will be explained further herein, the hybrid CiM architecture disclosed herein advantageously achieves the speed of a traditional digital computer architecture with the power savings of CiM.

There are several significant differences between a hybrid CiM architecture and a traditional CiM architecture. In a traditional CiM bitcell, the filter weight bit is stored by a pair of cross-coupled inverters. From the cross-coupled inverters, the filter weight bit couples through a first switch controlled by an activation bit. Depending upon a binary value of the activation bit, this activation-bit-controlled first switch is either open to prevent the filter weight bit from passing or closed to allow the filter weight bit to pass to a plate of a capacitor. A traditional CiM bitcell may include a second activation-bit-controlled switch controlled by a complement of the activation bit to selectively pass a complement of the filter weight bit to the capacitor plate. Regardless of how the activation-bit-controlled switches are implemented, a traditional CiM bitcell does not follow the foundry ground rules for a static random-access memory (SRAM) six-transistor bitcell. An SRAM six-transistor bitcell is denoted herein as a foundry bitcell as the foundry establishes the ground rules for its layout. An array of traditional CiM bitcells is thus not as dense as a comparable array of foundry bitcells.

To advantageously increase density, the filter weight bits in a hybrid CiM are stored in foundry bitcells. Since a foundry bitcell just has four transistors to form a pair of cross-coupled inverters and a corresponding pair of access transistors to form a total of six transistors, there is no room in a foundry bitcell for any additional switches for the multiplication of the filter weight bit with an activation bit. The multiplication of a filter weight bit by an activation bit in a hybrid CiM thus occurs in an arithmetic cell that is adjacent or near the foundry bitcells for the filter weight bits.

The arithmetic cell disclosed herein includes a capacitor having a first plate and a second plate. Using a first serial pair of switches coupled to the first plate, the arithmetic cell effectively multiplies a filter weight bit with a first activation bit to charge the first plate. Similarly, the arithmetic cell uses a second serial pair of switches coupled to the second plate to effectively multiply a filter weight bit with a second activation bit to charge the second plate. Depending upon the binary values of the bits being multiplied, the first plate either remains discharged or is charged to a charged voltage V. In the same fashion, the second plate either remains discharged or is charged to the charged voltage V. The result is that a voltage of the first plate may be 0 V, the charged voltage V, or substantially twice the charged voltage V depending upon the summation of the two multiplication operations.

After the two multiplications, the first and second plates of the capacitor may be discharged to ground so that another pair of multiplications may be performed. The arithmetic cell may perform the first pair of multiplications during a first phase of a memory clock signal cycle and perform the second pair of multiplications during a second phase of the memory clock signal cycle. Four bitcells would then be coupled to the arithmetic cell to supply the four activation bits being multiplied. The resulting hybrid CiM may thus be denoted as a "quadruple" hybrid CiM due to the four activation bits being multiplied in one memory clock signal cycle. Some example implementations will now be discussed in more detail.

An arithmetic cell 100 for a quadruple hybrid CiM is shown in FIG. 1. A capacitor C includes a first plate that couples to ground through a reset switch S3 controlled by a first reset signal rst1. Prior to a multiplication, the first reset signal rst1 is asserted to cause switch S3 to close to discharge the first plate of capacitor C to ground. As used herein, a binary signal is deemed to be "asserted" when that signal is binary true, regardless of whether this binary true state is represented by an active-high or an active-low convention. An active-high binary signal is thus asserted by being charged to a power supply voltage whereas an active-low binary signal is asserted by being discharged to ground. Similarly, the second plate of capacitor C couples to ground through a reset switch S4 controlled by a second reset signal rst2. Reset switch S4 closes in response to an assertion of the second reset signal rst2 to discharge the second plate of capacitor C to ground.

In a reset phase during operation of arithmetic cell 100, the first and second reset signals are asserted so that capacitor C is reset. For example, as shown in the timing diagram of FIG. 2, both the first reset signal rst1 and the second reset signal rst2 may be asserted between a time t0 and a time t1. Capacitor C and closed switches S3 and S4 are also illustrated in FIG. 2 during the reset phase.

A first multiplication phase φ1 follows the reset phase. Referring again to FIG. 1, a first serial pair of switches S1 and S2 responds to an activation bit signal and a first filter weight bit signal (Weight1), respectively, to effectively multiply the activation bit signal and the first filter weight bit signal to control the charging of the first plate of capacitor C. Switches S1 and S2 are arranged in series between a voltage source such as a power supply node for a memory power supply voltage Vdd and the first plate of capacitor C. Switch S1 is an example of a first switch in arithmetic cell 100. Similarly, switch S2 is an example of a second switch. A multiplexer 105 controls switch S1 by selecting between a zeroth activation bit signal in[0] and a first activation bit signal in[1]. Switch S1 is configured to close in response to a selected activation bit signal from multiplexer 105 having a first binary value and to remain open in response to the selected activation bit having a second binary value that is the complement of the first binary value. A first selection control signal Sel1 controls the selection by multiplexer 105 between the zeroth activation bit signal in[0] and the first activation bit signal in[1]. In a first occurrence of the first multiplication phase φ1, the first selection control signal Sel1 forces multiplexer 105 to select for the zeroth activation bit signal in[0]. In a subsequent occurrence of the first multiplication phase φ1, the first selection control signal Sel1 forces multiplexer 105 to select for the first activation bit signal in[1]. In this fashion, multiplexer 105 toggles between selecting either the zeroth activation bit signal in[0] or the first activation bit signal in[1].

Analogous to switch S1, switch S2 is configured to close in response to the first filter weight bit signal having a first binary value and to remain open in response to the first filter weight bit signal having a complementary second binary value. If both the selected activation bit signal from multiplexer 105 and the first filter weight bit signal have the first binary value, switches S1 and S2 close to cause the first plate of capacitor C to be charged to the power supply voltage Vdd. If either (or both) of the selected activation bit signal and the first filter weight bit signal do not have the second binary value, then the first plate of capacitor C remains discharged.

Figure 2:
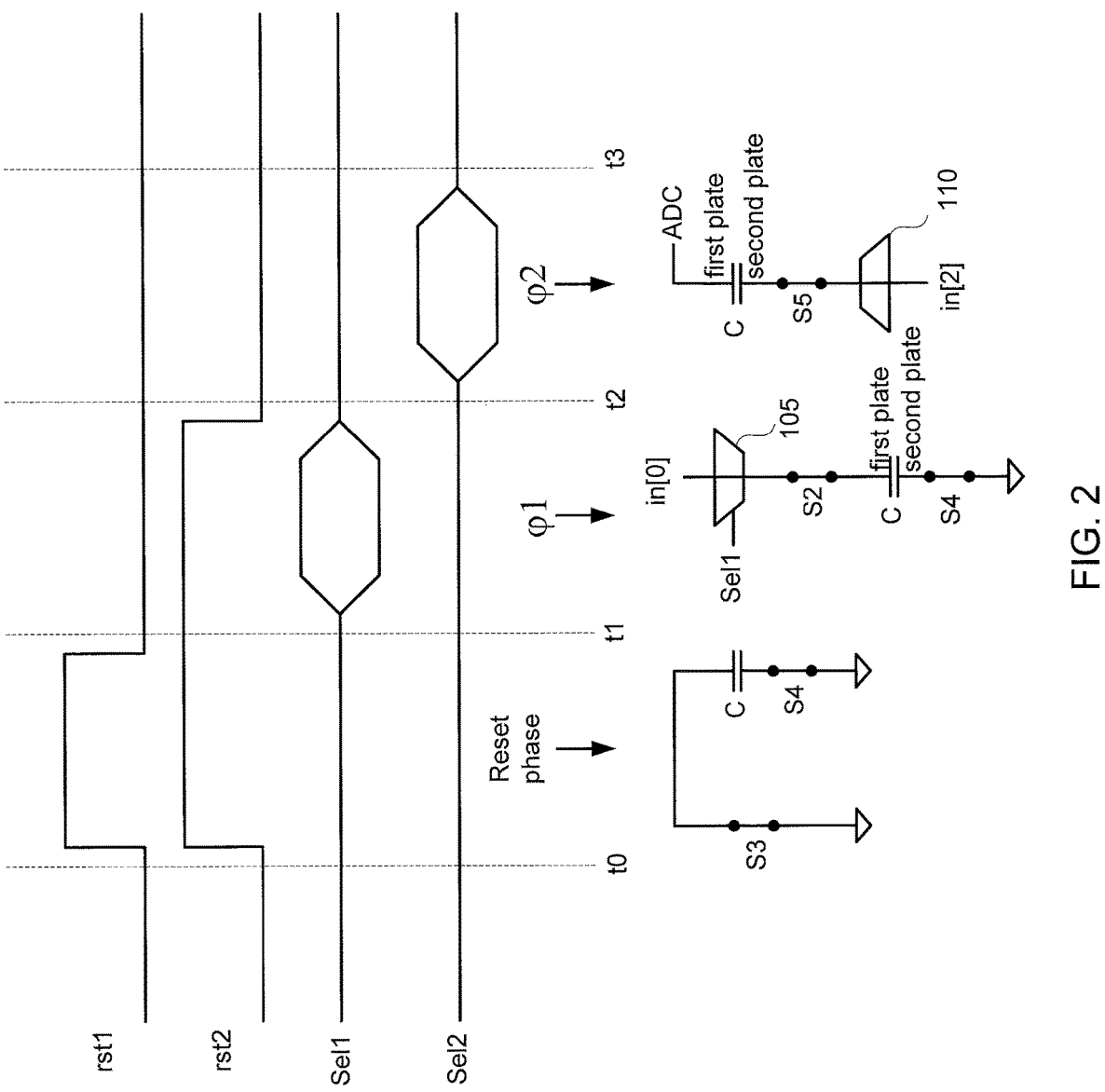
FIG. 2 includes a timing diagram for various signals in the arithmetic cell of FIG. 1 in accordance with an aspect of the disclosure.

As shown in FIG. 2 from time t1 to a time t2, the second reset signal rst2 remains asserted in the first multiplication phase φ1 so that the reset switch S4 remains closed to keep the second plate of capacitor C coupled to ground. A simplified view of arithmetic cell 100 is also shown in FIG. 2 for the first multiplication phase φ1. In this view, it is assumed that the multiplexer 105 is selecting for an asserted zeroth activation bit signal in[0] in an active-high convention and that the first filter weight bit signal has caused switch S2 to close. Switch S1 is thus omitted from this simplified view so that the asserted zeroth activation bit signal in[0] from multiplexer 105 may flow through the closed switch S2 and charge the first plate of capacitor C. Switch S4 is closed so that the second plate of capacitor C remains grounded during the first multiplication phase φ1.

As illustrated in FIG. 2, a second multiplication phase φ2 occurs from time t2 to a time t3 following the first multiplication phase φ1. Referring again to FIG. 1, a second serial pair of switches S5 and S6 responds to an activation bit signal and a second filter weight bit signal (Weight2), respectively, during the second multiplication phase φ2 to effectively multiply the activation bit signal and the second filter weight bit signal to control the charging of the second plate of capacitor C. Switch S6 is an example of a third switch in arithmetic cell 100. Similarly, switch S5 is an example of a fourth switch. Switch S3 is an example of a fifth switch. Similarly, switch S4 is an example of a sixth switch. In some implementations, the first and second filter weight bit signals are the same filter weight bit signal. Alternatively, the first and second filter weight bit signals may be unique. Switches S5 and S6 are arranged in series between a power supply node for the memory power supply voltage Vdd and the second plate of capacitor C. A multiplexer 110 controls switch S6 by selecting between a second activation bit signal in[2] and a third activation bit signal in[3]. Switch S6 is configured to close in response to a selected activation bit signal from multiplexer 110 having a first binary value and to remain open in response to the selected activation bit signal having a second binary value that is the complement of the first binary value. A second selection control signal Sel2 controls the selection by multiplexer 110 between the second activation bit signal in[2] and the third activation bit signal in[3]. In a first occurrence of the second multiplication phase φ2, the second selection control signal Sel2 forces multiplexer 110 to select for the second activation bit signal in[2]. In a subsequent occurrence of the second multiplication phase φ2, the second selection control signal Sel2 forces multiplexer 110 to select for the third activation bit signal in[3]. In this fashion, multiplexer 110 toggles between selecting either the second activation bit signal in[2] or the third activation bit signal in[3].

As shown in FIG. 2 for the second multiplication phase φ2 from time t2 to time t3, the second reset signal rst2 is unasserted so that the reset switch S4 remains open to keep the second plate of capacitor C isolated from ground. A simplified view of arithmetic cell 100 is also shown in FIG. 2 for the second multiplication phase φ2. In this view, it is assumed that the multiplexer 110 is selecting for an asserted second activation bit signal in[2] in an active-high convention and that the second filter weight bit signal has caused switch S5 to close. Switch S6 is thus omitted from this simplified view so that the asserted second activation bit signal in[2] from multiplexer 110 may flow through the closed switch S5 and charge the second plate of capacitor C. Switches S1 and S2 are open during the second multiplication phase φ2. Similarly, switches S5 and S6 are open during the first multiplication phase φ1.

If the first multiplication phase φ1 results in the first serial pair of switches S1 and S2 being closed, the first plate of the capacitor C is charged to a voltage V with respect to the grounded second plate. If the second multiplication phase φ2 results in the second serial pair of switches S5 and S6 being closed, the second plate of the capacitor is also charged to the voltage V. This boosts the voltage of the first plate of the capacitor to approximately twice the voltage V. There are thus three possibilities from the two multiplications: the voltage of the first plate of the capacitor may be 0 V, V, or 2V. The voltage of the first plate at the conclusion of the second multiplication phase φ2 may also be denoted as a compute voltage herein.

In an accumulation phase following the second multiplication phase φ2, a compute switch (not illustrated in FIG. 1) closes to couple a compute line 115 to the first plate of capacitor C. As will be explained further herein, multiple arithmetic cells may couple in parallel to compute line 115 so that their charges are summed by the capacitance of compute line 115. An analog-to-digital converter (ADC) 120 couples to compute line 115 to digitize the sum of the corresponding multiplications.

Figure 3:
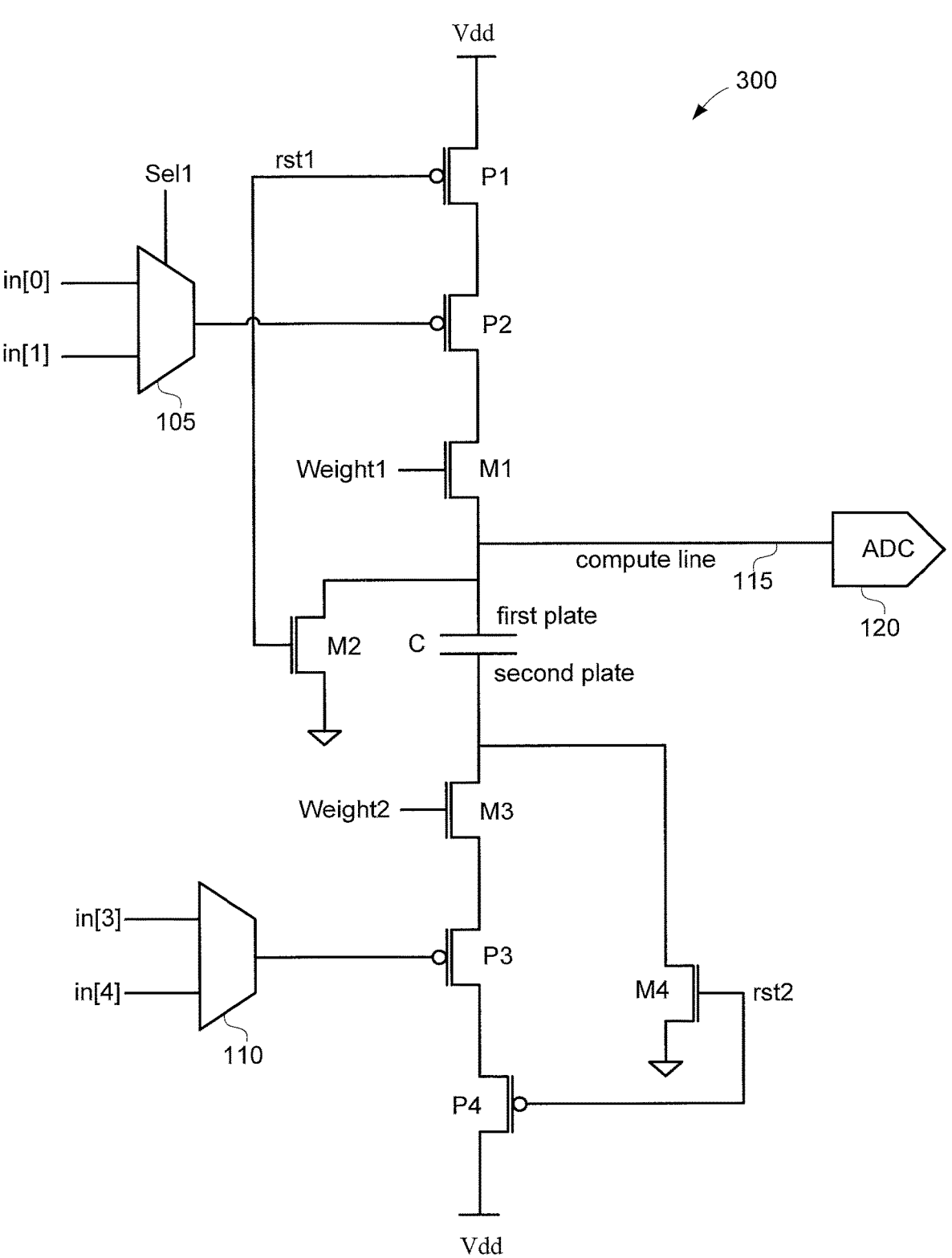
FIG. 3 is a circuit diagram for an implementation of the arithmetic cell of FIG. 1 in accordance with an aspect of the disclosure.

Another example arithmetic cell 300 is shown in FIG. 3. The first serial pair of switches are implemented by a p-type metal-oxide-semiconductor (PMOS) transistor P2 and an n-type metal-oxide-semiconductor (NMOS) transistor M1. Transistor P2 functions as switch S1 whereas transistor M1 functions as switch S2. An NMOS transistor M2 having a source coupled to ground and a drain coupled to the first plate of capacitor C functions as reset switch S3. When the first reset signal rst1 is asserted, transistor M2 conducts to ground the first plate of capacitor C. During the reset phase, transistors P2 and M1 are off. Despite these transistors being off during the reset phase, there is a possibility of leakage current flowing through transistors P2 and M1 from the power supply node to the grounded first plate of capacitor C. To reduce this leakage current possibility, a source of transistor P2 couples to a drain of a PMOS transistor P1 having a source coupled to the power supply node for the power supply voltage Vdd. The first reset signal rst1 also drives a gate of transistor P1 so that transistor P1 is switched off while the first reset signal rst1 is asserted to reduce the potential for leakage current flowing through transistors P2 and M1 during the reset phase.

In the first multiplication phase φ1, multiplexer 105 selects between the zeroth activation bit signal in[0] and the first activation bit signal in[1] to produce a selected activation bit responsive to the control of multiplexer 105 by the first select signal Sel1. The selected activation bit signal drives the gate of transistor P2. Similarly, a first filter weight bit (Weight1) signal drives a gate of transistor M1. In an active-high convention, transistors P2 and M1 will thus be conducting during the first multiplication phase φ1 when the filter weight bit is true and the selected activation bit is false. Since the first reset signal rst1 is de-asserted during the first multiplication phase φ1, transistor P1 will also be conducting. With all three transistors P1, P2, and M1 conducting, current flows from the power supply node to charge the first plate of capacitor C. Note the advantage of having a complement polarity in the first serial pair of transistors formed by transistor P2 and transistor M2. If both transistor P2 and transistor M2 were PMOS transistors, the first plate of capacitor C would be charged substantially to the power supply voltage Vdd during the first multiplication phase φ1. But the second multiplication phase φ2 can further boost the voltage of the first plate of capacitor C. Any switch transistors in compute line 115 could then be exposed to a compute voltage at the end of the two multiplication phases that is higher than the power supply voltage Vdd. The switch transistors in compute line 115 may then need protection from such a boosted voltage. But the opposite polarity (one PMOS, one NMOS) in the first serial pair of switch transistors P2 and M1 prevents this boosting of a compute voltage above the power supply voltage Vdd because transistor M1 passes a weak binary one due to the need to satisfy its threshold voltage to switch transistor M1 on. Should transistors P2 and M1 be conducting during the first multiplication phase φ1, the first plate of capacitor C will be charged to just a fraction of the power supply voltage Vdd (e.g., approximately Vdd/2 or even Vdd/3). In this fashion, second multiplication phase φ2 will not boost the compute voltage above the power supply voltage Vdd. Note that the polarity of transistors P2 and M1 may be switched in alternative implementations.

A second serial pair of switch transistors formed by an NMOS transistor M3 and a PMOS transistor P3 couple between the power supply node and the second plate of capacitor C. Analogous to transistor P1, a PMOS transistor P4 couples between a drain of transistor P3 and the power supply node. The second reset signal rst2 drives a gate of transistor P4 to reduce any leakage currents that may otherwise conduct through transistors M3 and P3 during the reset phase. The second reset signal rst2 also drives a gate of an NMOS transistor M4 having a source coupled to ground and a drain coupled to the second plate of the capacitor C. The second plate of capacitor C will thus be discharged to ground during the reset phase while the second reset signal rst2 is asserted.

In the second multiplication phase φ2, multiplexer 110 selects between the second activation bit signal in[2] and the third activation bit signal in[3] to produce a selected activation bit signal responsive to the control of multiplexer 110 by the second select signal Sel2. The selected activation bit signal drives the gate of transistor P3. Similarly, a second filter weight bit (Weight2) signal drives a gate of transistor M3. In an active-high convention, transistors P3 and M3 will thus be conducting during the second multiplication phase φ2 when the second filter weight bit signal is true and the selected activation bit signal from multiplexer 110 is false. Since the second reset signal rst2 is de-asserted during the second multiplication phase φ2, transistor P4 will also be conducting. With all three transistors P3, P4, and M3 conducting, charge flows from the power supply node Vdd to charge the second plate of capacitor C. As discussed analogously with respect to the first plate of capacitor C during the first multiplication phase φ1, the second plate of capacitor C is not charged to the power supply voltage Vdd with transistors M3, P3, and P4 all being conductive. Instead, the second plate of capacitor C is charged to some fraction of the power supply voltage such as Vdd/2 or Vdd/3 depending upon the threshold voltage of transistor M3. The voltage of the first plate of capacitor C forms a compute voltage to drive compute line 115 during the accumulation phase. The compute voltage at the end of the second multiplication phase φ2 is thus limited to be 0 V, a fraction of Vdd (Vdd/X), and 2Vdd/X, where X is a positive plural integer.

Figure 4:
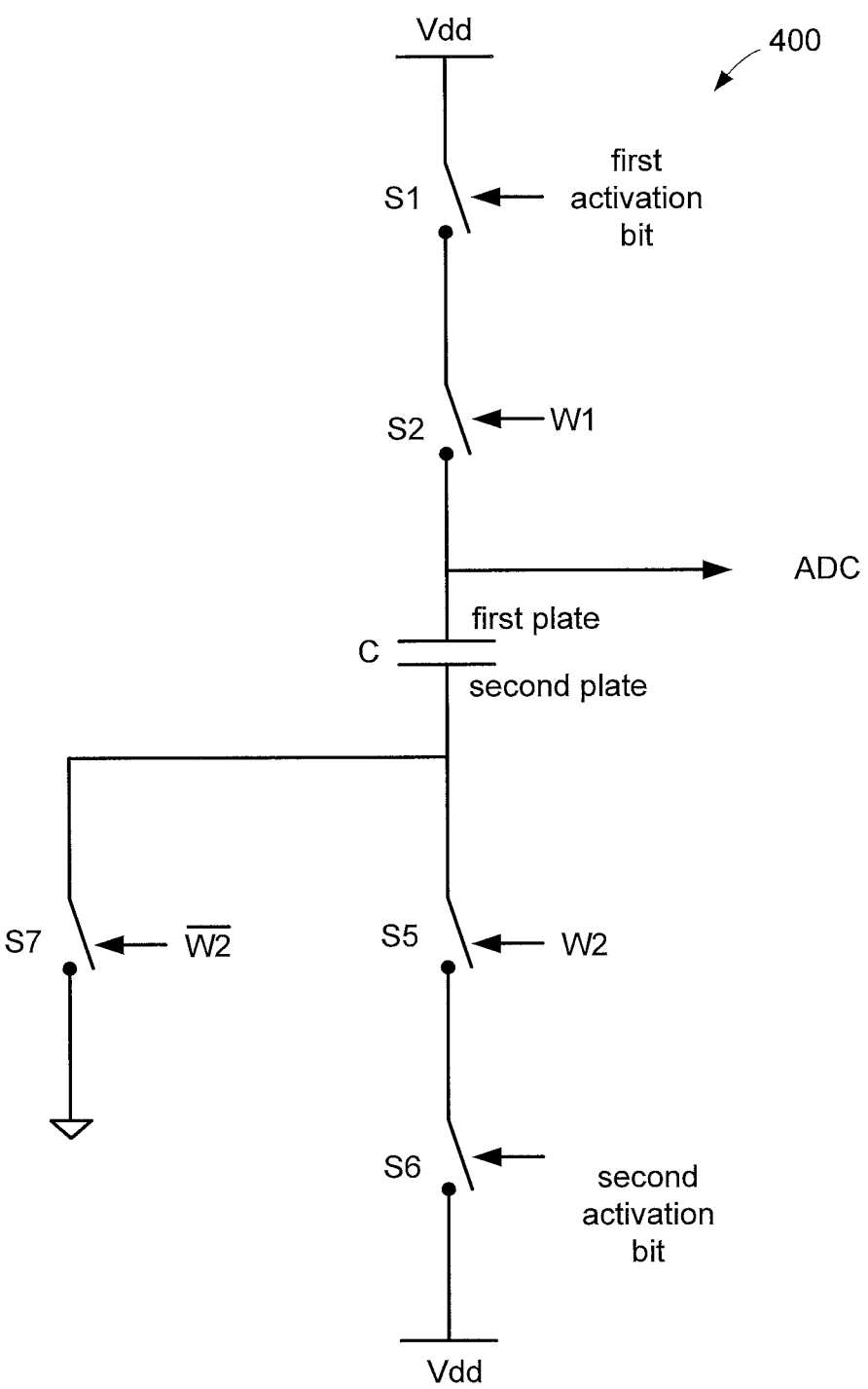
FIG. 4 illustrates an alternative implementation of the arithmetic cell of FIG. 1 in which the second plate of the capacitor couples to ground through a switch controlled by a complement of a filter weight bit signal in accordance with an aspect of the disclosure.

Another example arithmetic cell 400 is shown in FIG. 4. The first serial pair of switches S1 and S2 couples between the power supply node and the first plate of capacitor C as discussed for arithmetic cell 100. A first filter weight bit signal W1 controls whether switch S2 is conducting. Similarly, a first activation bit signal controls whether switch S1 is conducting. A second serial pair of switches S5 and S6 couples between the power supply node and the second plate of capacitor C analogously as discussed for arithmetic cell 100. A second filter weight bit signal W2 controls whether switch S5 is conducting. Similarly, a second activation bit signal controls whether switch S6 is conducting. Prior to the first and second multiplication phases, both the first plate and the second plate are discharged through corresponding reset switches (not illustrated). Should the binary value of the second filter weight bit signal W2 be such that switch S5 is not conducting during the second multiplication phase φ2, the previously-grounded second plate of capacitor C would then float. To address any leakage in capacitor C that could affect the voltage of the first plate of capacitor C, the second plate of capacitor C couples through a switch S7 to ground. A complement of the second filter weight bit signal controls whether switch S7 is conducting. Should the binary value of the second filter weight bit signal W2 be such that switch S5 is not conducting during the second multiplication phase φ2, switch S7 is thus conducting to keep the second plate of capacitor C grounded. In this fashion, any leakage effects in capacitor C that could otherwise affect the voltage of the first plate as established during the first multiplication phase φ1 are reduced when switch S5 is kept open during the second multiplication phase φ2. Switch S7 is another example of a fifth switch as defined herein.

Figure 5:
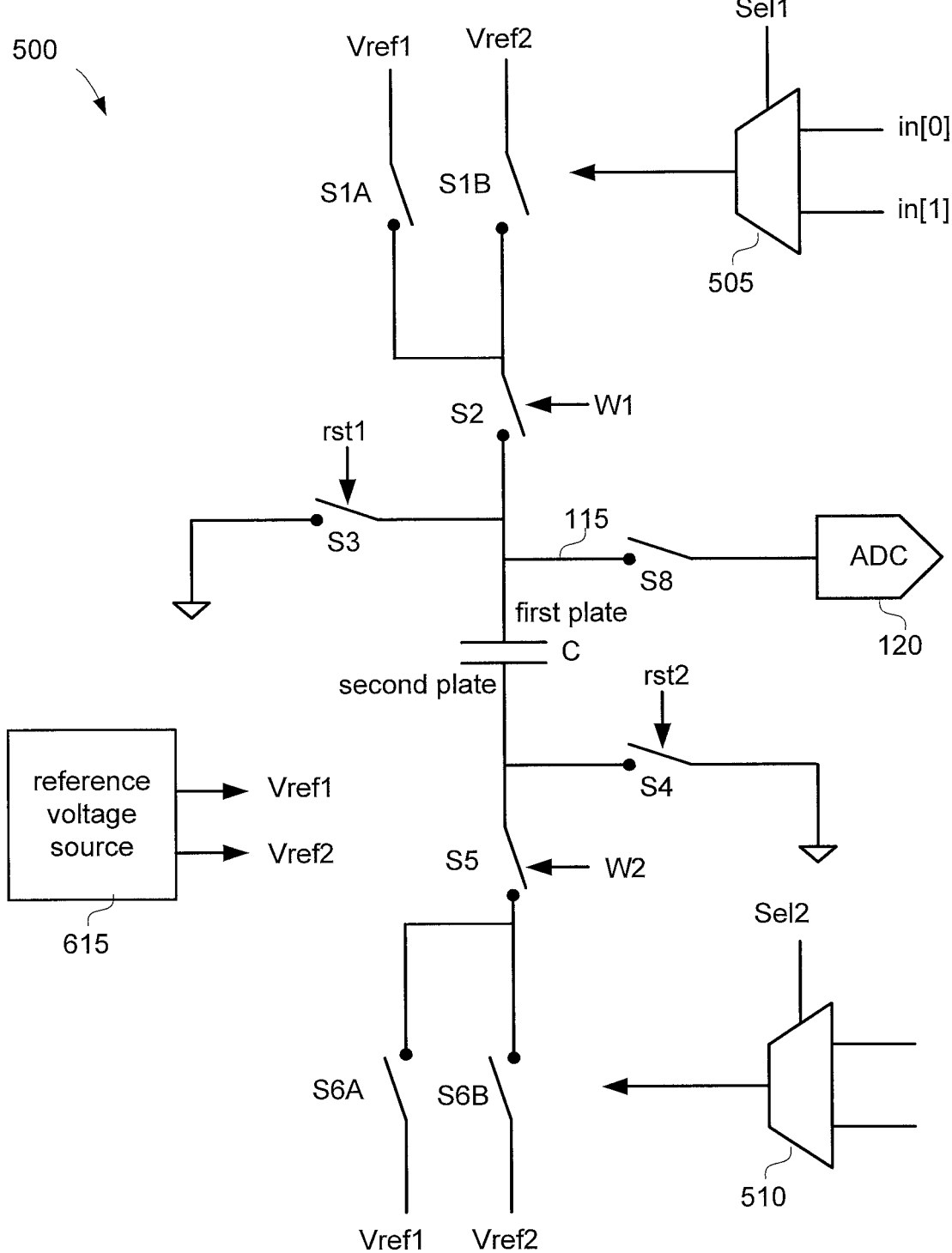
FIG. 5 illustrates an alternative implementation of the arithmetic cell of FIG. 1 in which the voltage source provides a first reference voltage and a second reference voltage in accordance with an aspect of the disclosure.

Another example arithmetic cell 500 is shown in FIG. 5. To further reduce any excessive boosting of the compute voltage, the power supply voltage Vdd is not used to drive the first and second serial pair of switches. Instead, a reference voltage source provides a reference voltage (e.g., a first reference voltage Vref1 and a second reference voltage Vref2) that may be a fraction of the power supply voltage. In the first serial pair of switches used to control the charging of the first plate of capacitor C, switch S1 is replaced by a switch S1A and a switch S1B. Switch S1A couples between a node for the first reference voltage Vref1 and switch S2. Similarly, switch S1B couples between a node for the second reference voltage Vref2 and switch S2. A multiplexer 505 selects between the zeroth activation bit signal in[0] and the first activation bit signal in[1] responsive to the first select signal Sel1 as discussed for multiplexer 105 arithmetic cell 100. But in arithmetic cell 500, multiplexer 505 also selects which switch (switch S1A or S1B) will be controlled by the selected activation bit signal. Note that the activation bit signals may have different weights. For example, the zeroth activation bit signal in[0] may be the least significant bit of an activation bit word whereas the first activation bit signal in[1] may be the next-to-least significant bit of the activation bit word. More generally, the zeroth activation bit signal in[0] may have a first bit significance whereas the first activation bit signal in[1] may have a second bit significance that is different from the first bit significance.

Given these different bit weights, the first and second reference voltages Vref1 and Vref2 may be weighted accordingly. For example, the second reference voltage Vref2 may be twice the first reference voltage Vref1 or vice versa. Multiplexer 505 may then select for the appropriate one of switches S1A and S1B based upon the bit significance or weight of the selected activation bit signal. The use of the first and second reference voltages Vref1 and Vref 2 also assists in preventing the boosting of the compute voltage developed on the first plate of capacitor C at the conclusion of the second multiplication phase φ2 from being boosted above the power supply voltage Vdd. For example, suppose that the maximum value of the first and second reference voltages Vref1 and Vref2 is Vdd/2. Ignoring any reduction through the opposite polarity of switch transistors as discussed with regard to arithmetic cell 100, the maximum value of the compute voltage in arithmetic cell 500 would be approximately the power supply voltage Vdd.

The second serial pair of switches used to control the charging of the second plate of capacitor C may be arranged accordingly. For example, switch S6 discussed with regard to arithmetic cell 100 is replaced with a switch S6A and a switch S6B in arithmetic cell 500. Switch S6A couples between a node for the first reference voltage Vref1 and switch S5. Similarly, switch S6B couples between a node for the second reference voltage Vref2 and switch S5. A multiplexer 510 selects between the second activation bit signal in[2] and the third activation bit signal in[3] responsive to the second select signal Sel2 as discussed for multiplexer 110 in arithmetic cell 100. But in arithmetic cell 500, multiplexer 510 also selects which switch (switch S6A or S6B) will be driven by the selected activation bit signal based upon the binary significance of the selected activation bit signal as discussed for multiplexer 505. A switch S8 couples between the first plate of capacitor C and compute line 115. Switch S8 is closed during the accumulation phase following the second multiplication phase φ2 so that compute line 115 may accumulate the charge from the multiplication phases. Switch S8 is an example of a fifth switch in arithmetic cell 500. Switch S8 may also be denoted as a compute switch. ADC 120 may then digitize the analog voltage on compute line 115. The remaining components of arithmetic cell 500 are as discussed for arithmetic 100.

Figure 6:
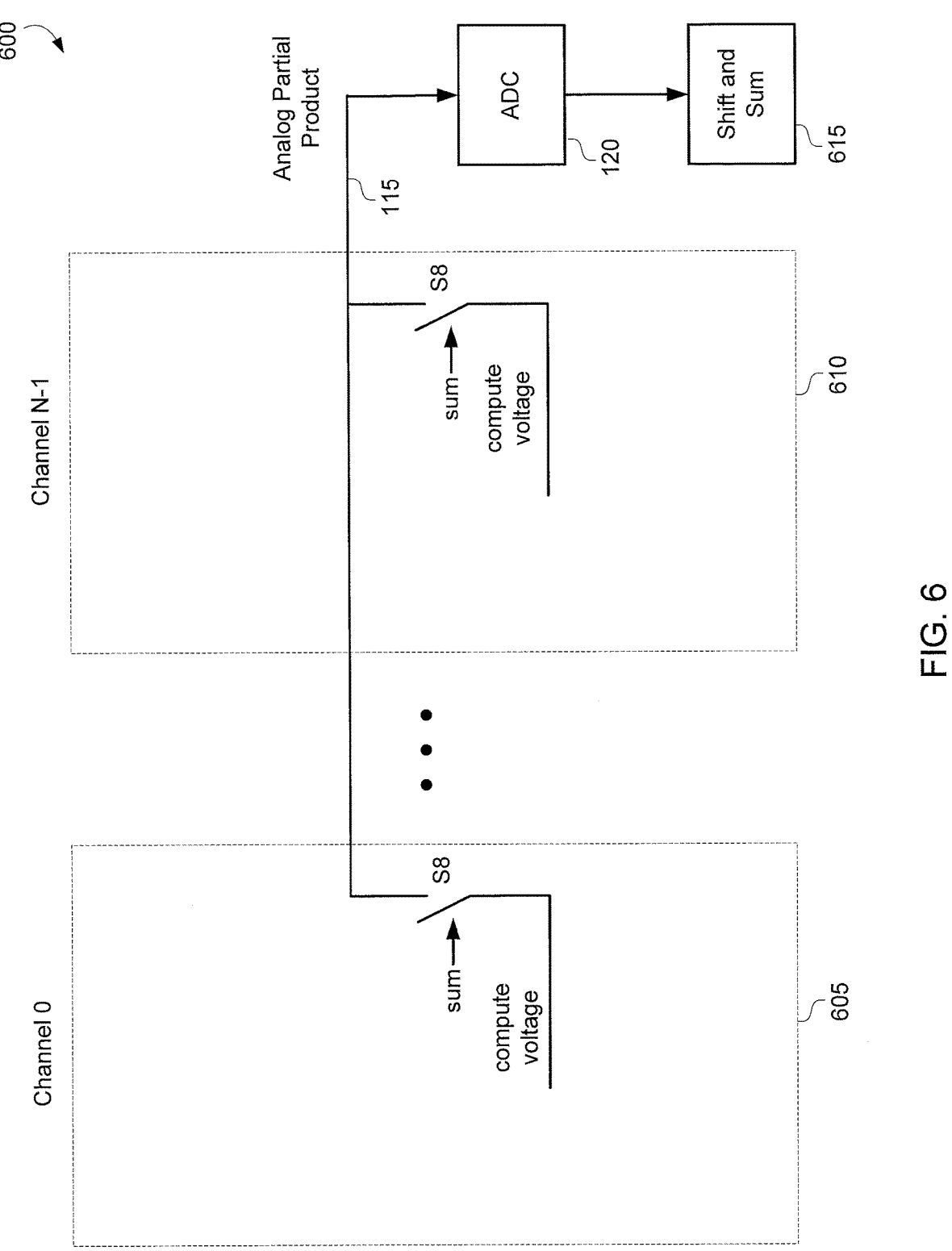
FIG. 6 illustrates an array of arithmetic cells as disclosed herein coupled in parallel to a compute line in accordance with an aspect of the disclosure.

A plurality or array of arithmetic cells as discussed herein may be coupled to a common compute line 115 during the accumulation phase. An example array 600 of N arithmetic cells is shown in FIG. 6, where N is a plural positive integer. For illustration clarity, only an initial zeroth arithmetic cell 605 and a (N−1)th arithmetic cell 610 from array 600 are shown in FIG. 6. The value of N may be less than a number M of the channels for the filter tap being calculated. For example, if there are 64 channels (M=64), an example value of N may be eight. Each arithmetic cell includes a first serial pair of switches (not illustrated) that control the charging of the first plate of the cell's capacitor C (not illustrated). Similarly, each arithmetic cell includes a second serial pair of switches (not illustrated) that control the charging of the second plate of the cell's capacitor C. The first serial pair of switches are controlled during the first multiplication phase φ1. Similarly, the second serial pair of switches are controlled during the second multiplication phase φ2 to develop the compute voltage on the first plate of the cell's capacitor C.

During a subsequent accumulation phase, switch S8 in each arithmetic cell closes in response to an assertion of a sum signal. Each switch S8 couples between the first plate of the arithmetic cell's capacitor C and compute line 115. The resulting charge presented to an input terminal of ADC 120 is thus a partial product of the bit-wise multiplication and accumulation of the filter tap since N is less than the number M of channels.

In the example implementation in which M (the total number of channels) is 64 and N (the subset of channels for the partial product) is eight, there would thus be eight arrays 600 and eight ADCs 120 to complete the bit-wise multiplication and summation of a filter tap. Depending upon the binary significance of the filter weight bits and the activation bits being multiplied, the resulting partial products are shifted and summed by a shift and sum circuit 615 coupled to an output terminal of ADC 120 to provide the filter tap output. For example, suppose the filter weight and activation are each expressed with only one bit of precision. In that case, shift and sum circuit 620 needs merely to sum the partial products as there is no need to shift. If the filter weight word and activation word are each expressed with two bits, then four separate partial products are summed with the appropriate shifting depending upon the binary significance of the activation bit and filter weight bit being multiplied. Shift and sum circuit 620 may also be denoted as a digital adder.

Regardless of the precision of the activation and filter weight, the resulting partial product is quite advantageous even though additional ADCs are required over a traditional CiM accumulation that accumulates over all the channels. By accumulating over all the channels as performed in a traditional CiM calculation, only a single ADC would be sufficient. But to accumulate over 64 channels requires an ADC with seven bits of dynamic range. Such a relatively high dynamic-range ADC consumes power and increases costs. By accumulating only over a subset of the channels, ADC 120 in array 600 may have reduced dynamic range and thus demand less power and reduce costs. For example, ADC 120 may have only four bits of dynamic range to accommodate the accumulation over eight channels in array 600 (note that an eight-channel accumulation does not correspond to three bits of dynamic range because the resulting partial sum may range from zero to eight, which gives nine possible values). The partial accumulation in a hybrid CiM results in the addition of the partial products in the digital domain in the shift and sum circuit 620. Since these digital additions would not be performed in a traditional CiM accumulation across all channels, one may thus appreciate the "hybrid" nature of a hybrid CiM architecture in that the accumulation is performed partly in the analog domain and partly in the digital domain. A hybrid CiM architecture thus enjoys the power savings of analog multiplication and accumulation performed by the charge sharing between the capacitors C yet does not suffer from excessive power consumption in the ADCs 120 because the partial accumulation reduces their required dynamic range.

Figure 7:
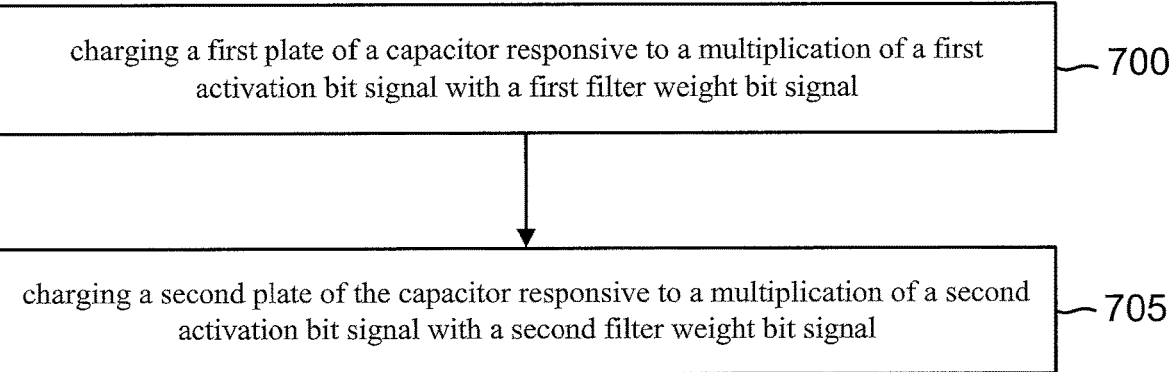
FIG. 7. is a flow chart for an example method of operation for a compute-in-memory as disclosed herein in accordance with an aspect of the disclosure.

FIG. 7 illustrates a flowchart for an example method of operation for a hybrid compute-in-memory. The method includes an act of 700 of charging a first plate of a capacitor responsive to a multiplication of a first activation bit signal with a first filter weight bit signal. The charging of the first plate of capacitor C during the first multiplication phase φ1 as discussed with regard to arithmetic cells 100, 300, 400, and 500 is an example of act 700. The method also includes an act 705 of charging a second plate of the capacitor responsive to a multiplication of a second activation bit signal with a second filter weight bit signal. The charging of the second plate of capacitor C during the second multiplication phase φ2 as discussed with regard to arithmetic cells 100, 300, 400, and 500 is an example of act 705.

Some aspects of the disclosure will now be summarized in the following example clauses.

Clause 1. A compute-in-memory, comprising:
a capacitor including a first plate and a second plate;
a voltage source;
a first switch configured to close responsive to a first activation bit signal;
a second switch coupled in series with the first switch between the voltage source and the first plate, the second switch being configured to close responsive to a first filter weight bit signal;
a third switch configured to close responsive to a second activation bit signal; and
a fourth switch coupled in series with the third switch between the voltage source and the second plate, the fourth switch being configured to close responsive to a second filter weight bit signal.

Clause 2. The compute-in-memory of clause 1, further comprising:
a first multiplexer configured to select between a first pair of activation bit signals to provide the first activation bit signal.

Clause 3. The compute-in-memory of clause 2, further comprising:
a second multiplexer configured to select between a second pair of activation bit signals to provide the second activation bit signal.

Clause 4. The compute-in-memory of any of clauses 1-3, further comprising:
a fifth switch coupled between the first plate and ground, wherein the fifth switch is configured to close responsive to a first reset signal.

Clause 5. The compute-in-memory of clause 4, further comprising:
a sixth switch coupled between the second plate and ground, wherein the sixth switch is configured to close responsive to a second reset signal.

Clause 6. The compute-in-memory of any of clauses 1-2, further comprising:
a fifth switch; and
an analog-to-digital converter having an input terminal coupled to the first plate through the fifth switch.

Clause 7. The compute-in-memory of clause 6, further comprising:
a digital adder coupled to an output terminal of the analog-to-digital converter.

Clause 8. The compute-in-memory of any of clauses 1-2, further comprising:
a fifth switch coupled between the second plate and ground, the fifth switch being configured to close responsive to a complement of the second filter weight bit signal.

Clause 9. The compute-in-memory of any of clauses 1-8, wherein the voltage source is a node for a power supply voltage for the compute-in-memory.

Clause 10. The compute-in-memory of any of clauses 1-8, wherein the voltage source is configured to provide a reference voltage that is a fraction of a power supply voltage for the compute-in-memory.

Clause 11. The compute-in-memory of clause 10, wherein the fraction of the power supply voltage is approximately one-half of the power supply voltage.

Clause 12. The compute-in-memory of any of clauses 1-8, wherein the voltage source is configured to provide a first reference voltage that is a first fraction of a power supply voltage for the compute-in-memory and to provide a second reference voltage that is a second fraction of the power supply voltage for the compute-in-memory.

Clause 13. The compute-in-memory of clause 12, wherein the voltage source is further configured so that the first fraction is approximately twice the second fraction.

Clause 14. The compute-in-memory of any of clauses 1-13, wherein the first switch comprises an n-type metal-oxide-semiconductor (NMOS) switch transistor and wherein the second switch comprises a p-type metal-oxide-semiconductor (PMOS) switch transistor.

Clause 15. The compute-in-memory of any of clauses 1-13, wherein the first switch comprises a p-type metal-oxide-semiconductor (PMOS) switch transistor and wherein the second switch comprises an n-type metal-oxide-semiconductor (NMOS) switch transistor.

Clause 16. A method of operation for a compute-in-memory, comprising:
charging a first plate of a capacitor responsive to a multiplication of a first activation bit signal with a first filter weight bit signal; and

13 charging a second plate of the capacitor responsive to a multiplication of a second activation bit signal with a second filter weight bit signal.

Clause 17. The method of clause 16, wherein the charging of the first plate occurs during a first multiplication phase, the method further comprising:

coupling the first plate and the second plate to ground during a reset phase prior to the first multiplication phase.

Clause 18. The method of any of clauses 16-17, wherein the charging of the first plate occurs during a first multiplication phase, the method further comprising:

coupling the second plate to ground during the first multiplication phase.

Clause 19. The method of clause 18, wherein the charging of the second plate occurs during a second multiplication phase subsequent to the first multiplication phase.

Clause 20. The method of clause 19, further comprising:

accumulating a charge from the first plate onto a compute line subsequent to the second multiplication phase.

Clause 21. The method of clause 20, further comprising:

digitizing a voltage of the compute line following the accumulating of the charge from the first plate onto the compute line.

Clause 22. A compute-in-memory, comprising:

a compute line; and a plurality of arithmetic cells, each arithmetic cell including a capacitor having a first plate and a second plate, a first serial pair of switches coupled between the first plate and a voltage source; a second serial pair of switches coupled between the second plate and the voltage source, and a compute switch coupled between the first plate and the compute line.

Clause 23. The compute-in-memory of clause 22, further comprising:

an analog-to-digital converter having an input terminal coupled to the compute line.

Clause 24. The compute-in-memory of clause 23, further comprising:

a digital adder coupled to an output terminal of the analog-to-digital converter.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. An apparatus, comprising:

a capacitor including a first plate and a second plate;

a voltage source;

a first switch configured to close responsive to a first activation bit signal;

a second switch coupled in series with the first switch between the voltage source and the first plate, the second switch being configured to close responsive to a first filter weight bit signal to multiply the first filter weight signal bit with the first activation bit signal to charge the first plate;

a third switch configured to close responsive to a second activation bit signal; and a fourth switch coupled in series with the third switch between the voltage source and the second plate, the fourth switch being configured to close responsive to a second filter weight bit signal to multiply the second filter weight bit signal with the second activation bit signal to charge the second plate; and wherein a voltage of the first plate is a tri-level voltage prior to accumulation as a multiple of a charged voltage of an arithmetic cell from a plurality of arithmetic cells and wherein the first plate is coupled to an analog-to-digital converter (ADC) to digitize a sum of multiplications from the plurality of arithmetic cells.

2. The apparatus of claim 1, further comprising:

a first multiplexer configured to select between a first pair of activation bit signals to provide the first activation bit signal.

3. The apparatus of claim 2, further comprising:

a second multiplexer configured to select between a second pair of activation bit signals to provide the second activation bit signal.

4. The apparatus of claim 1, further comprising:

a fifth switch coupled between the first plate and ground, wherein the fifth switch is configured to close responsive to a first reset signal.

5. The apparatus of claim 4, further comprising:

a sixth switch coupled between the second plate and ground, wherein the sixth switch is configured to close responsive to a second reset signal.

6. The apparatus of claim 1, further comprising:

a fifth switch; and the analog-to-digital converter having an input terminal coupled to the first plate through the fifth switch.

7. The apparatus of claim 6, further comprising:

a digital adder coupled to an output terminal of the analog-to-digital converter.

8. The apparatus of claim 1, further comprising:

a fifth switch coupled between the second plate and ground, the fifth switch being configured to close responsive to a complement of the second filter weight bit signal.

9. The apparatus of claim 1, wherein the voltage source is a node for a power supply voltage for the compute-in-memory.

10. The apparatus of claim 1, wherein the voltage source is configured to provide a reference voltage that is a fraction of a power supply voltage for the compute-in-memory.

11. The apparatus of claim 10, wherein the fraction of the power supply voltage is approximately one-half of the power supply voltage.

12. The apparatus of claim 1, wherein the voltage source is configured to provide a first reference voltage that is a first fraction of a power supply voltage for the compute-in-memory and to provide a second reference voltage that is a second fraction of the power supply voltage for the compute-in-memory.

13. The apparatus of claim 12, wherein the voltage source is further configured so that the first fraction is approximately twice the second fraction.

14. The apparatus of claim 1, wherein the first switch comprises an n-type metal-oxide-semiconductor (NMOS) switch transistor and wherein the second switch comprises a p-type metal-oxide-semiconductor (PMOS) switch transistor.

15. The apparatus of claim 1, wherein the first switch comprises a p-type metal-oxide-semiconductor (PMOS) switch transistor and wherein the second switch comprises an n-type metal-oxide-semiconductor (NMOS) switch transistor.

16. A method comprising:

charging a first plate of a capacitor responsive to a multiplication of a first activation bit signal with a first filter weight bit signal; and charging a second plate of the capacitor responsive to a multiplication of a second activation bit signal with a second filter weight bit signal, wherein a voltage of the first plate is a tri-level voltage prior to accumulation as a multiple of a charged voltage of an arithmetic cell from a plurality of arithmetic cells.

17. The method of claim 16, wherein the charging of the first plate occurs during a first multiplication phase, the method further comprising:

coupling the first plate and the second plate to ground during a reset phase prior to the first multiplication phase.

18. The method of claim 16, wherein the charging of the first plate occurs during a first multiplication phase, the method further comprising:

coupling the second plate to ground during the first multiplication phase.

19. The method of claim 18, wherein the charging of the second plate occurs during a second multiplication phase that is subsequent to the first multiplication phase.

20. The method of claim 19, further comprising: accumulating a charge from the first plate onto a compute line subsequent to the second multiplication phase.

21. The method of claim 20, further comprising:

digitizing a voltage of the compute line following the accumulating of the charge from the first plate onto the compute line.

22. An apparatus comprising:

a compute line; and a plurality of arithmetic cells, wherein each arithmetic cell including:

a capacitor having a first plate and a second plate, a first serial pair of switches coupled between the first plate and a voltage source to multiply a first filter weight bit signal with a first activation bit signal to charge the first plate, a second serial pair of switches coupled between the second plate and the voltage source to multiply a second filter weight bit signal with a second activation bit signal to charge the second plate, and a compute switch coupled between the first plate and the compute line, wherein a voltage of the first plate is a tri-level voltage prior to accumulation as a multiple of a charged voltage of an arithmetic cell from a plurality of arithmetic cells.

23. The apparatus of claim 22, further comprising:

an analog-to-digital converter having an input terminal coupled to the compute line.

24. The apparatus of claim 23, further comprising:

a digital adder coupled to an output terminal of the analog-to-digital converter.

* * * * *